United States Patent [19]

Sugiyama

[11] Patent Number: 4,500,981
[45] Date of Patent: Feb. 19, 1985

[54] JITTER COMPENSATION SYSTEM IN A ROTARY RECORDING MEDIUM REPRODUCING APPARATUS

[75] Inventor: Hiroyuki Sugiyama, Isehara, Japan

[73] Assignee: Victor Company of Japan, Ltd., Kanagawa, Japan

[21] Appl. No.: 382,276

[22] Filed: May 26, 1982

[30] Foreign Application Priority Data

Jun. 1, 1981 [JP] Japan ................................ 56-84190

[51] Int. Cl.³ ............................................. G11B 21/02
[52] U.S. Cl. ..................................................... 369/43
[58] Field of Search ............... 358/342, 322, 311, 338, 358/907; 369/43, 111, 126, 47, 48, 44

[56] References Cited

U.S. PATENT DOCUMENTS

| 3,711,641 | 1/1973 | Palmer . | |
|---|---|---|---|
| 3,965,482 | 6/1976 | Burrus | 358/322 |
| 4,190,859 | 2/1980 | Kinjo . | |
| 4,415,936 | 11/1983 | Sugiyama . | |
| 4,426,692 | 1/1984 | Hirata | 369/43 |

FOREIGN PATENT DOCUMENTS

| 5224429 | 6/1967 | Japan . |
| 52-53624 | 4/1977 | Japan . |
| 54-34356 | 3/1979 | Japan . |
| 1454901 | 11/1976 | United Kingdom . |
| 1520004 | 8/1978 | United Kingdom . |
| 2060214 | 4/1981 | United Kingdom . |
| 2086090 | 5/1982 | United Kingdom . |
| 2086091 | 5/1982 | United Kingdom . |
| 2086089 | 5/1982 | United Kingdom . |
| 2090024 | 6/1982 | United Kingdom . |

Primary Examiner—Donald McElheny, Jr.
Attorney, Agent, or Firm—Ladas & Parry

[57] ABSTRACT

A jitter compensation system in a rotary recording medium reproducing apparatus having a reproducing transducer including a reproducing element for reproducing recorded signals from a rotary medium, where the rotary recording medium is recorded with an information signal and also recorded with reference signals for tracking control with predetermined periods, comprises a separation circuit for separating the reference signals from a signal reproduced by the reproducing transducer, a detection circuit for detecting the separated reference signals and obtaining a signal having a predetermined period and predetermined frequency, a standard signal supplying circuit for supplying a standard signal having a frequency equal to the predetermined frequency, a phase comparator for comparing phases of the predetermined frequency signal thus obtained and the standard signal supplied thereto, to produce a phase comparison error signal, and a displacing circuit for displacing the reproducing element of the reproducing transducer along a relative scanning direction with respect to the rotary recording medium, in response to the output error signal of the phase comparing means.

5 Claims, 5 Drawing Figures

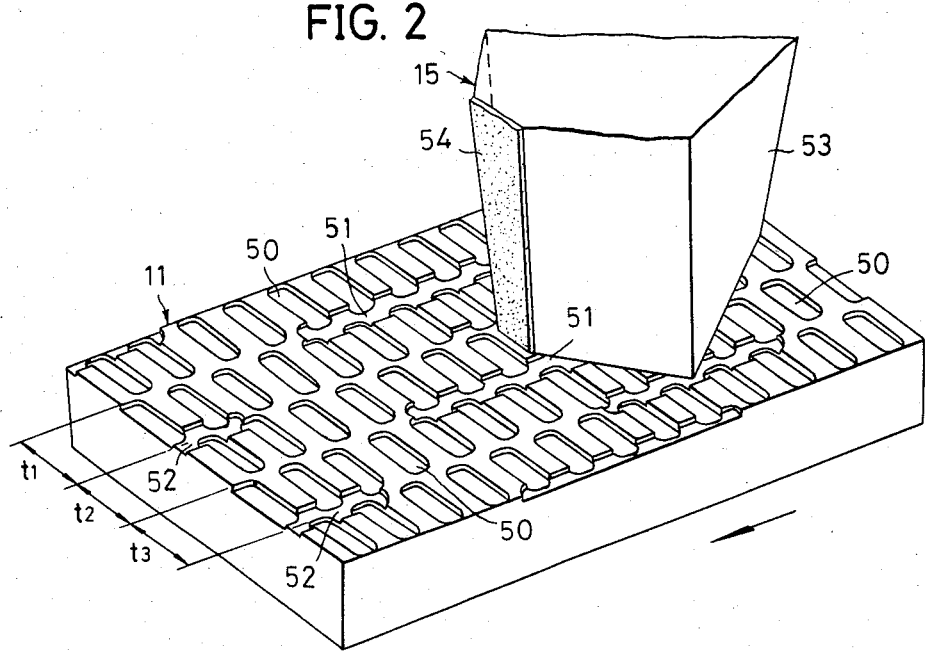
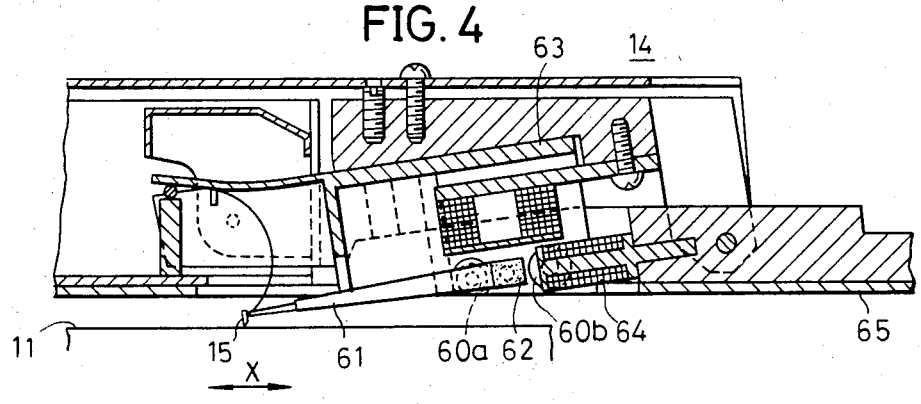

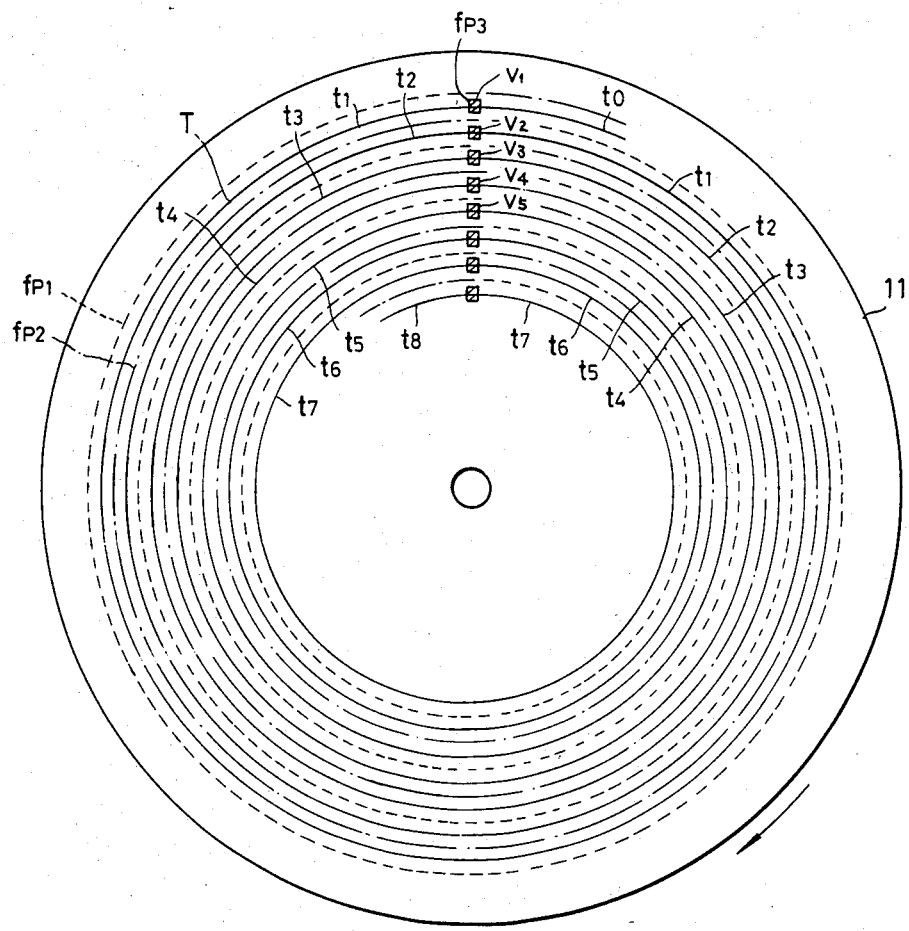

JITTER COMPENSATION SYSTEM IN A ROTARY RECORDING MEDIUM REPRODUCING APPARATUS

BACKGROUND OF THE INVENTION

The present invention generally relates to jitter compensation systems in rotary recording medium reproducing apparatuses, and more particularly to a jitter compensation system capable of performing jitter compensation by use of reference signals for tracking control which are reproduced from a rotary recording medium, in a rotary recording medium reproducing apparatus.

A new information signal recording and/or reproducing system has been proposed in U.S. Pat. Nos. 4,315,283 and 4,322,836, of which the assignee is the same as that of the present application. According to this proposed system, the recording system forms pits in accordance with an information signal being recorded along a spiral track on a flat rotary recording medium (hereinafter simply referred to as a disc), without forming a groove therein. In the reproducing system, a reproducing stylus traces over along this track to reproduce the recorded information signal in response to variations in electrostatic capacitance.

In this system, since no grooves for guiding the reproducing stylus are provided on the disc, it becomes necessary to record pilot or reference signals on or in the vicinity of a track of a program information signal, on the disc. Upon reproduction, the reference signals are reproduced together with the program information signal. Tracking control is carried out so that the reproducing stylus accurately traces along the track in response to the reproduced reference signals.

By use of this previously proposed system, there is no possibility whatsoever of the reproducing stylus or the disc being damaged since the recording track has no groove. The reproducing stylus can trace the same portion of the track repeatedly many times, whereby a special reproduction such as still, slowmotion, or quick-motion reproduction becomes possible in a case where the recorded information signal is a video signal. Moreover, operations such as a random access, highspeed search, and automatic cueing operation in which the reproducing stylus is shifted to a position of a desired recorded program where the reproduction is to be started, can be performed with ease.

However, in the reproducing apparatus, when irregularity (wow and flutter) exists in the rotation of the turntable which is placed with the disc to rotate the disc, eccentricity exists in the center hole of the disc, distortion is introduced in the disc upon molding of the disc, and the like, jitter (error in the time base) is introduced in the reproduced signal. The above jitter covers a frequency range from a relatively low frequency component corresponding to the rotational period of the disc due to such causes as the above irregular rotation and eccentric center hole, to a relatively high frequency component due to such causes as the above distortion in the disc, mainly, few hundreds Hz to 1.5 khz.

In a case where the reproduced information signal is a color video signal, the above jitter gives rise to color shading, swinging of picture image in the reproduced picture of the receiver, and the quality of the reproduced picture greatly deteriorates.

There is a conventional jitter compensation system in which the horizontal synchronizing signal is separated from a video signal reproduced from the disc by a reproducing transducer. In this system, the phase of the separated horizontal synchronizing signal is compared with that of a reference signal, and the jitter compensation is performed by displacing a reproducing element of the reproducing transducer along a relative scanning direction with respect to the disc in response to an output phase error signal obtained as a result of the phase comparison.

However, because the converntional jitter compensation system uses the horizontal synchronizing signal separated from the reproduced video signal, there is a disadvantage in that the system can only be applied to a reproducing apparatus for reproducing discs recorded with video signals.

On the other hand, in a case where the disc is recorded with a PCM audio signal as the information signal, the above conventional jitter compensation system cannot be employed because the horizontal synchronizing signal does not exist within the reproduced signal.

The PCM audio signal is normally recorded and reproduced by use of an interleaving system and a deinterleaving system. That is, in the recording system, an input analog signal is sampled for every appropriate time period in a sample-and-hold circuit, and the resulting sampled signal is converted into a modulated digital signal in an analog-to-digital (A/D) converter. This modulated digital signal is fed into a memory in which data write-in and read-out operations are controlled by a control pulse, and a series of word groups are arranged where the words obtained for every one sample of the digital signal respectively interleave with each other in a state separated from each other by a period of 10-odd H (H denotes one horizontal synchronizing period). Here, "one word" refers to the combination of bits obtained from one sample. The time period represented by 10-odd H, is determined in conformance with the format used.

A composite synchronizing signal is added to the signal thus obtained to produce a composite digital signal, which is then recorded on a magnetic tape by a VTR. This rearrangement of the order of data is referred to as "interleaving". Since the interleaving of data results in the distribution of the signal information, even when the recorded or reproduced signal is deficient over one or more horizontal scanning (H) periods due to dropout, the associated signal present in the separate horizontal scanning period serves to reproduce the information.

A data part is extracted from the signal reproduced from the disc. This data part, which undergoes waveshaping, is then converted into a binary coded digital signal, and thereafter supplied to a memory where the signal are written in and read out responsive to a control pulse and restored back into the original order. This restoring of the signal back into the original order, is called de-interleaving. The resulting signal is supplied to a digital-to-analog (D/A) converter where it is restored back into the original analog signal.

Conventionally, because the conventional jitter compensation system cannot be used for the above described reasons, when the above de-interleaving is performed in the reproducing system, the information signal which is reproduced in a state including the jitter component is written into a memory by de-interleaving with a constant clock signal. The information signal is read out from the above memory in the regular order by eliminating the jitter component. Therefore, there was a disadvantage in that the memory needs a capacity obtained by adding the capacity for the jitter component to the capacity required to store the reproduced signal into the memory by de-interleaving.

SUMMARY OF THE INVENTION

Accordingly, it is a general object of the present invention to provide a novel and useful jitter compensation system in a rotary recording medium reproducing apparatus, in which the above described disadvantages have been overcome.

Another and more specific object of the present invention is to provide a jitter compensation system in a rotary recording medium reproducing apparatus, which performs jitter compensation by use of reference signals for tracking control which are reproduced from a rotary recording medium by a reproducing element. The system of the present invention does not use the horizontal synchronizing signal of the video signal for the jitter compensation. According to the system of the present invention, the recorded information signal is not limited to the video signal, and the jitter compensation can be performed effectively even when the recorded information signal is a PCM audio signal. Hence, upon de-interleaving of the above PCM audio signal, an additional capacity for the jitter component is not necessary for the capacity of a memory used.

Other objects and further features of the present invention will be apparent from the following detailed description when read in conjunction with the accompanying drawings.

BRIEF DESCRIPTION OF THE DRAWINGS

FIG. 2 is a perspective view, in an enlarged scale, showing a part of a rotary recording medium together with a tip end part of a reproducing stylus;

FIG. 3 shows a track pattern on the rotary recording medium;

FIG. 4 is a side view, in cross section, showing an example of a reproducing transducer provided with a jitter compensation mechanism.

DETAILED DESCRIPTION

Figure 1:
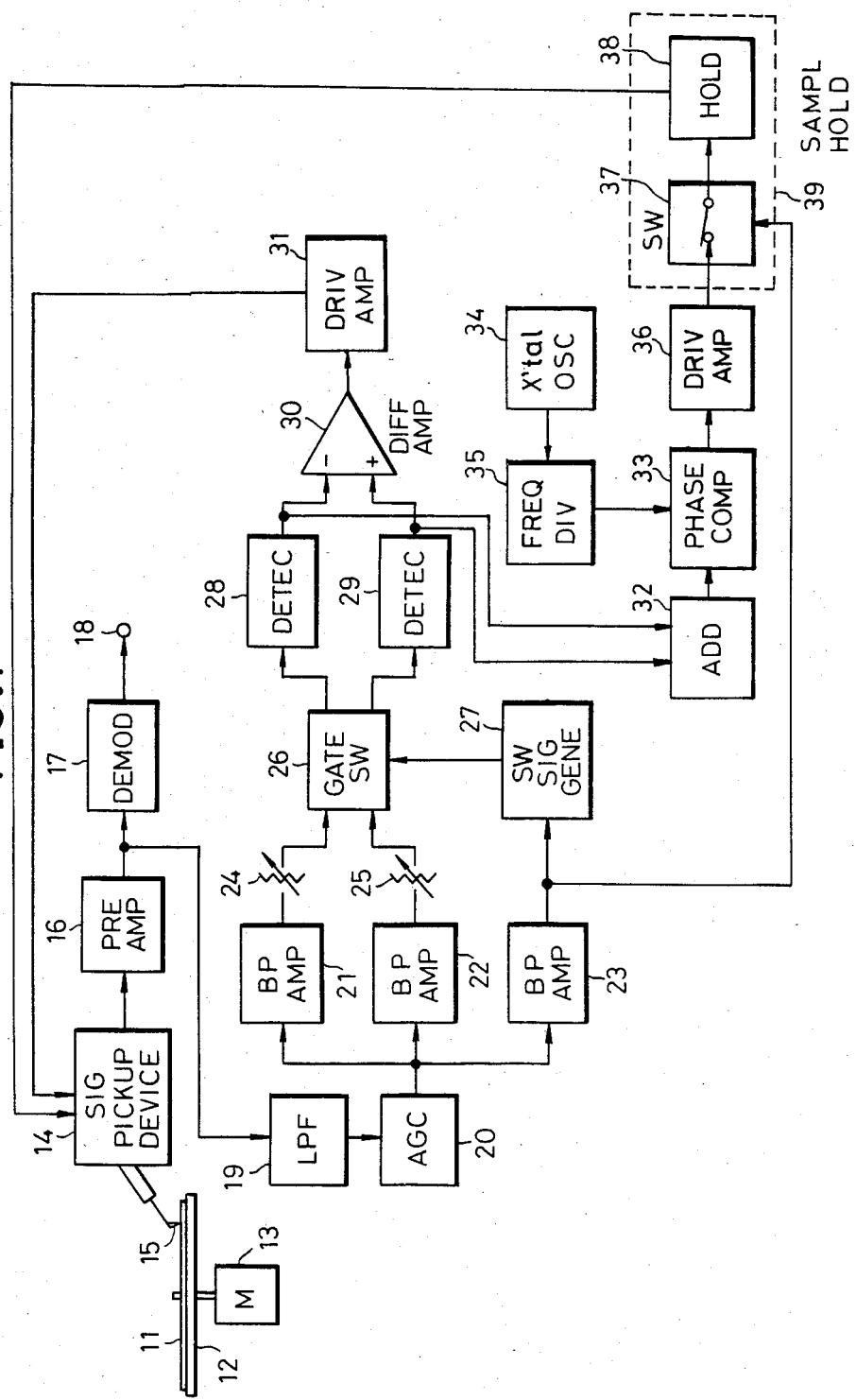
FIG. 1 is a system block diagram showing a rotary recording medium reproducing apparatus system an embodiment of a jitter compensation system according to the present invention.

In FIG. 1, a rotary recording medium (hereinafter simply referred to as a disc) 11 is placed onto a turntable 12, and rotated by a motor 13 at a rotational speed of 900 rpm, for example. A signal pickup device 14, used as a reproducing transducer, has a reproducing stylus 15, and moves continuously and linearly in a direction from the outer peripheral part to the inner peripheral part at a speed equal to the distance of one track pitch per revolution of the turntable 12, during a forward normal reproduction mode. Accordingly, the stylus 15 of the signal pickup device 14 travels radially across the rotating disc 11 and relatively traces the spiral track of the disc 11.

A main information signal comprising a video signal and an audio signal is recorded on a spiral track with pits formed on the disc 11 according to the information contents of the signal. One part of this track is shown in an enlarged scale in FIG. 2. In FIG. 2, track turns of a single continuous spiral track, corresponding to each revolution of the disc 11, are designated by t1, t2, t3, . . . Each track turn is constituted by the formation of pits 50 of a main information signal along a plane track path and has no stylus guide groove formed therein. With respect to one track turn t1, for every interval corresponding to one horizontal scanning period (H) of the video signal, that is, with a frequency interval $f_H$, pits 51 of a first reference signal fp1 are formed on one lateral side of the track as viewed in the track path direction. Pits 52 of a second reference signal fp2 are formed on the other side of the track.

At an intermediate position between the centerlines of adjacent track turns, only pits of either one kind of the pits 51 and 52 of the above reference signals fp1 and fp2 are formed, and moreover, with respect to one track, the sides on which the pits 51 and 52 are formed are alternated for every track turn. That is, if the pits 51 and 52 are respectively formed on the right and left sides of one track turn, for example, the pits 52 and 51 will respectively be formed on the right and left sides of each of the adjacent track turns.

The tip end of the reproducing stylus 15 has a shape shown in FIG. 2. The reproducing stylus 15 is constituted by a stylus structure 53 having a disc tracing surface which has a width greater than a track width, and an electrode 54 fixed to the rear face of the stylus structure 53. As the reproducing stylus 15 traces along a track on the disc 11 rotating in a direction indicated by an arrow, the main information signal recorded thereon by the formation of pits is reproduced as variations in the electrostatic capacitance between the surface of the disc 11 and the electrode 54 of the reproducing stylus 15.

On the disc 11, as indicated in FIG. 3, the main information signal is recorded along a spiral track T. In FIG. 3, the tracks of the first reference signal fp1 is shown by dotted lines while the second reference signal fp2 is shown by one-dot chain lines. The successive track parts corresponding to one revolution of the disc of a single spiral track T is designated by track turns t1, t2, t3, . . . . Furthermore, a third reference signal fp3 is recorded at the starting end positions V1, V2, V3, . . . of each of the track turns t1, t2, t3, . . . , that is, at positions where the reference signals fp1 and fp2 change over.

In the system shown in FIG. 1, a reproduced signal picked up from the disc 11 as minute variations in the electrostatic capacitance by the reproducing stylus 15 of the signal pickup device 14, is supplied to a preamplifier 16 having a resonant circuit. The resonance frequency of the resonant circuit varies in response to this variation in the electrostatic capacitance, and is formed into a signal of a desired level. The resulting output of the preamplifier 16, is demodulated into the original main information signal by a demodulator 17 and is obtained as an output through an output terminal 18.

The output signal of the preamplifier 16 is supplied to a lowpass filter 19 wherein the reference signals fp1, fp2, and fp3 are separated. The output reference signals pass through an automatic gain control circuit 20, and are respectively supplied to amplifiers 21, 22, and 23. Here, each of the amplifiers 21, 22, and 23 is a kind of a bandpass amplifier respectively designed to have steep passing frequency characteristics at only the respective frequency fp1, fp2, and fp3. As a result, the signals having frequencies fp1 and fp2 are respectively separated and obtained from the amplifiers 21 and 22. These signals respectively pass through level adjustors 24 and 25, wherein the levels of the signals are adjusted. The resulting signals are then supplied to a gate switching circuit 26. The reference signal fp3 separated and amplified at this bandpass amplifier 23, is supplied to a switching signal generating circuit 27.

The gate switching circuit 26 performs switching of the reference signals fp1 and fp2 every one revolution period of the disc 11 upon normal reproduction, in response to the switching signal generated by the switching signal generating circuit 27 which is applied thereto. Hence, due to the switching signal which reverses polarity every 1/15 seconds, the signals fp1 and fp2 are always alternately supplied to detecting circuits 28 and 29 from the gate switching circuit 26.

The detecting circuits 28 and 29 detect the envelopes of their respective input references signals, and convert the input reference signals into DC voltages. These DC voltages are then supplied to a differential amplifier 30. The differential amplifier 30 compares the output signals of the two detecting circuits 28 and 29 which vary in response to the reproduced levels of the reference signals fp1 and fp2, and generates an output tracking error signal which indicates the direction of the tracking error and the error quantity. This tracking error signal is amplified to a specific level by a driving amplifier 31.

The output signal of the driving amplifier 31 is applied to tracking coils 60a and 60b shown in FIG. 4 of the signal pickup device 14 as a control signal, to control these tracking coils 60a and 60b. Hence, tracking control is performed with respect to the reproducing stylus 15 so that the above tracking error signal becomes zero, that is, so that the reproducing stylus 15 accurately traces over the track T on the disc 11.

In the signal pickup device 14 shown in FIG. 4, the reproducing stylus 15 is fixed at the tip end of a cantilever 61. The cantilever 61 is fitted and provided with a permanent magnet 62 at the rear end thereof. The rear end part of the cantilever 61 is supported at a lower part of a pickup cartridge frame 63 by a resilient support member (not shown). A coil 64 for jitter compensation is provided at the rear along an axial line of the cantilever 61 The signal pickup device 14 is provided on a carriage 65, and the reproducing stylus 15 is transferred along the radial direction of the disc 11 when the carriage 65 is transferred.

In FIG. 1, the outputs of the detecting circuits 28 and 29 are supplied to an adder 32 wherein these outputs are added. An output signal of the adder 32 is supplied to a phase comparator 33. Because the first and second reference signals fp1 and fp2 are recorded with an interval corresponding to 1H, that is, with the frequency interval $f_H$, the frequency of the outputs from the detecting circuits 28 and 29 is equal to $f_H$.

The frequency of an output reference signal of a crystal oscillator 34, is frequency-divided into the frequency $f_H$ at a frequency divider 35. The frequency-divided signal is supplied to the phase comparator 33 as a phase comparing standard signal. The phases of the signal from the adder 32 and the standard signal from the frequency divider 35, are compared at the phase comparator 33. An output phase error signal obtained from the phase comparator 33, is a signal in accordance with a jitter component in the signal reproduced from the disc 11.

The error signal from the phase comparator 33 is supplied to the jitter compensation coil 64 of the signal pickup device 14, through a driving amplifier 36 and a sample-and-hold circuit 39 which is in a closed state. Accordingly, the cantilever 61 is displaced along the longitudinal direction thereof, that is, along the relative tracing direction on the disc 11. The cantilever 61 is thus displaced so that jitter is not introduced along the directions indicated by an arrow X, to perform jitter compensation.

During the interval on the disc 11 where the third reference signal fp3 is recorded, the first and second reference signals fp1 and fp2 are not recorded. Hence, the third reference signal fp3 which is separated at the amplifier 23 is applied to a switching circuit 37 as a switching signal, to open the switching circuit 37 which is normally in the closed state. A holding circuit 38 holds the error signal voltage obtained at a time immediately before the switching circuit 37 opens. Therefore, during the interval in which the first and second reference signals fp1 and fp2 do not exist, that is, during the interval in which the third reference signal fp3 exists, the jitter compensation is performed in a state immediately before the switching circuit 37 opens.

According to the system of the present invention, the jitter compensation is performed according to the jitter component included in the first and second reference signals fp1 and fp2 for tracking control. Because the system of the present invention does not use the horizontal synchronizing signal as in the conventional system, the jitter compensation can be performed in the reproducing apparatus for reproducing discs recorded with digital audio signals. In addition, the memory capacity of a memory in the demodulating circuit for demodulation can be reduced, since it is not necessary to provide additional capacity for the jitter component. Of course, the jitter compensation by the system according to the present invention can also be performed with respect to reproduction of discs recorded with video signals.

As a modification of the above described embodiment, the adder 32 may be omitted. In this case, only one of the outputs from the detecting circuits 28 and 29 is supplied to the phase comparator 33.

In the above embodiment of the invention, the system including the amplifiers 21 through 23 and reaching to the driving amplifier 31, is designed for tracking control. Thus, there are cases where the output signal waveforms of the detecting circuits 28 and 29 are not suited for use as jitter compensation signals.

Figure 5:
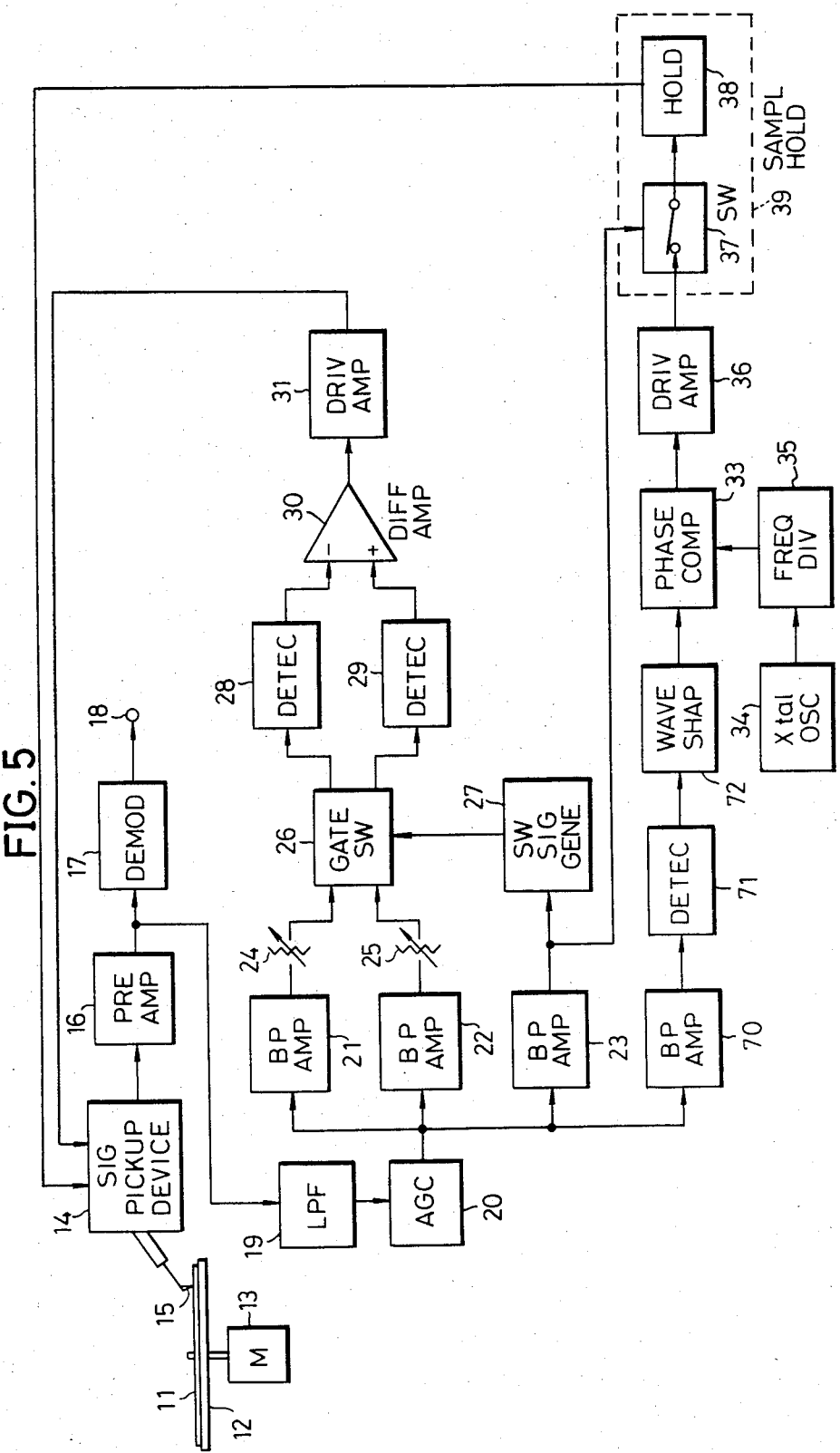
FIG. 5 is a system block diagram showing a rotary recording medium reproducing apparatus including another embodiment of a jitter compensation system according to the present invention.

An embodiment which has eliminated the above problem is shown in FIG. 5. In FIG. 5, those parts which are the same as those corresponding parts in FIG. 1 are designated by the same reference numerals, and their description will be omitted.

The output signal of the automatic gain control circuit 20, is also supplied to a bandpass amplifier 70. This bandpass amplifier 70 has a filtering band characteristic for passing both the first and second reference signals fp1 and fp2. Hence, the first and second reference signals fp1 and fp2 are obtained from the bandpass amplifier 70. It is not necessary to obtain the first and second reference signals independently in order to obtain the jitter compensation signal. These first and second reference signals fp1 and fp2 may be obtained simultaneously, and the filtering characteristic of the amplifier 70 need not be a steep or sharp characteristic.

The output reference signals fp1 and fp2 from the amplifier 70 are detected at a detecting circuit 71, and obtained as a signal having the frequency $f_H$. The output signal of the detecting circuit 71 is subjected to wave-shaping at a wave-shaping circuit 72, and then supplied to the phase comparator 33. The construction and operation of the remaining circuit parts are the same as in the above embodiment described in conjunction with FIG. 1.

According to the present embodiment of the invention, the system including the amplifier 70 and the elements in the succeeding stages may be designed exclusively for jitter compensation, without any relation to the tracking control system. Hence, the jitter compensation can be performed more effectively than in the above described embodiment of the invention.

Further, the present invention is not limited to these embodiments, but various variations and modifications may be made without departing from the scope of the present invention.

What is claimed is:

1. A jitter compensation system in a rotary recording medium reproducing apparatus having a reproducing transducer including a reproducing element for reproducing recorded signals from a rotary recording medium, said rotary recording medium having recorded thereon an information signal and also recorded thereon reference signals for tracking control with a predetermined period, said reference signals for tracking control recorded on said rotary recording medium comprising first and second reference signals for tracking control, said first and second reference signals being changed over for each recorded track turn of the information signal on said rotary recording medium and alternately recorded between each track turn, said rotary recording medium also having recorded thereon a third reference signal for indicating the changeover of said first and second reference signals, said first and second reference signals not being recorded in an interval in which said third reference signals exists, said jitter compensation system comprising:

separation means for separating said reference signals from a signal reproduced by said reproducing transducer;

detection means for detecting the separated reference signals and for obtaining at least one detection signal having a period which is dependent on a jitter;

standard signal supplying means for supplying a standard signal having a period equal to said predetermined period;

Phase comparing means for comparing means for comparing phases of said standard signal from said standard signal supplying means and at least one detection signal from said detection means, to produce a phase comparison error signal;

displacing means for displacing the reproducing element of said reproducing transducer along a relative scanning direction with respect to said rotary recording medium, in response to the output error signal of said phase comparing means; and interrupting means responsive to the separated third reference signal, for interrupting the output of said phase comparing means during the interval in which said third reference signal exists.

2. A jitter compensation system as claimed in claim 1 said interrupting means comprises normally closed switching means which opens in response to said third reference signal, and means for holding the output error signal at a point in time immediately before said switching means opens, to apply the held output error signal to said displacing means.

3. A jitter compensation system as claimed in claim 1 in which said rotary recording medium reproducing apparatus further comprises tracking control signal forming means for forming a tracking control signal, and tracking control means for performing tracking control with respect to said reproducing element, said detecting means comprises first and second detecting means for respectively detecting said first and second reference signal and supplying output signals to said tracking control signal forming means, and at least one of the outputs of said first and second detecting means is supplied to said phase comparing means.

4. A jitter compensation system as claimed in claim 3 which further comprises adding means for adding the output signals of said first and second detecting means, and supplying the added output to said phase comparing means.

5. A jitter compensation system as claimed in claim 1 in which said rotary recording medium reproducing apparatus further comprises tracking control signal forming means for forming a tracking control signal, and tracking control means for performing tracking control with respect to said reproducing element, said separation means comprises means for independently separating said first and second reference signals, and means for separating said first and second reference signals together, and said detecting means comprises first and second detection means for respectively detecting said first and second reference signals and supplying output signals to said tracking control signal forming means, and third detecting means for detecting together said first and second reference signals separated together and supplying an output signal to said phase comparing means.

* * * * *